United States Patent
Ding et al.

(10) Patent No.: US 9,753,565 B2
(45) Date of Patent: Sep. 5, 2017

(54) TOUCH CONTROL DISPLAY DEVICE AND DRIVING METHOD THEREOF

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xiaoliang Ding, Beijing (CN); Xue Dong, Beijing (CN); Haisheng Wang, Beijing (CN); Yingming Liu, Beijing (CN); Tao Ren, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 329 days.

(21) Appl. No.: 14/439,608

(22) PCT Filed: Sep. 24, 2014

(86) PCT No.: PCT/CN2014/087315
§ 371 (c)(1),
(2) Date: Apr. 29, 2015

(87) PCT Pub. No.: WO2015/169033
PCT Pub. Date: Nov. 12, 2015

(65) Prior Publication Data
US 2015/0346885 A1    Dec. 3, 2015

(30) Foreign Application Priority Data

May 6, 2014 (CN) .......................... 2014 1 0189042

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 3/0416* (2013.01)

(58) Field of Classification Search
CPC ............................... G06F 3/041–3/047; G06F 2203/041–2203/04112

(Continued)

(56) References Cited

U.S. PATENT DOCUMENTS

2010/0026636 A1    2/2010 Jang et al.

FOREIGN PATENT DOCUMENTS

CN    102262472 A    11/2011
CN    102866815 A    1/2013

(Continued)

OTHER PUBLICATIONS

International Search Report and Written Opinion of the International Searching Authority for International Application No. PCT/CN2014/087315, mailed Feb. 2, 2015. Translation provided by Dragon Intellectual Property Law Firm.

*Primary Examiner* — Michael Pervan
(74) *Attorney, Agent, or Firm* — Harness, Dickey & Pierce, P.L.C.

(57) ABSTRACT

Each column of a touch control driving electrode block matrix in a first substrate of the touch control display device includes first and second touch control driving electrode blocks. A first touch control driving signal is transmitted in turns to the first touch control driving electrode blocks in corresponding matrix columns of the touch control driving electrode block matrix. Gate lines corresponding to the first touch control driving electrode blocks which receive the first touch control driving signal are in a off state; when one gate (Continued)

line corresponding to the first touch control driving electrode block in one matrix column is in the off state, one gate line corresponding to the second touch control driving electrode block in the matrix column is in an on state. A second touch control driving signal is transmitted to the second touch control driving electrode blocks between adjacent display time periods.

16 Claims, 6 Drawing Sheets

(58) Field of Classification Search
  USPC .................. 178/18.01–19.07; 345/173–178
  See application file for complete search history.

(56) References Cited

FOREIGN PATENT DOCUMENTS

| | | |
|---|---|---|
| CN | 102955639 A | 3/2013 |
| CN | 103018994 A | 4/2013 |
| CN | 103049155 A | 4/2013 |
| CN | 103186308 A | 7/2013 |
| CN | 103336644 A | 10/2013 |
| CN | 103995633 A | 8/2014 |
| CN | 203812226 U | 9/2014 |
| KR | 20130067869 A | 6/2013 |

| in a display time period, inputting a first touch control driving signal to a first touch control driving signal transmission line which is connected with a first touch control driving electrode block in a first matrix column; a gate line corresponding to the first touch control driving electrode block which receives the first touch control driving signal being in an off state; when the gate line corresponding to the first touch control driving electrode block in the first matrix column is in the off state, a gate line corresponding to a second touch control driving electrode block in the first matrix column is in an on state | 91 |

| in the display time period, inputting, in a predetermined order, a first touch control driving signal to first touch control driving signal transmission lines which are connected with first touch control driving electrode blocks in other matrix columns | 92 |

| between the display time period and a next display time period, inputting a second touch control driving signal to a second touch control driving signal transmission line | 93 |

Fig. 9

TOUCH CONTROL DISPLAY DEVICE AND DRIVING METHOD THEREOF

CROSS-REFERENCE TO RELATED APPLICATIONS

The present application is the U.S. national phase of PCT Application No. PCT/CN2014/087315 filed on Sep. 24, 2014, which claims a priority of the Chinese patent application No. 201410189042.4 filed on May 6, 2014, the entire disclosures of both of which are incorporated herein by reference in their entirety.

TECHNICAL FIELD

The present disclosure relates to the field of display technology, in particular to a touch control display device and a driving method thereof.

BACKGROUND

A touch screen, as an input media, may provide better convenience for users compared with a keyboard or a mouse. According to different implementation principles, the touch screens can be divided into resistive, capacitive, surface acoustic wave, infrared touch screens, etc. Currently, the resistive and capacitive touch screen technologies are widely used.

A mutual capacitive touch screen is more and more popular by virtue of its higher sensitivity and multi-touch advantages. The basic principle of the mutual capacitive touch screen is: applying voltage in a driving line side and detecting signal changes in a detection line side. The driving line determines an X coordinate, and the detection line determines a Y coordinate. During detection, the driving lines in the X direction is progressively scanned; when scanning each row of the driving lines, signal in each detection line is read. After a round of scanning, all intersection points of rows and columns can be scanned and X*Y signals are scanned. The detection method can specifically determine coordinates of multiple points, and thus multi-touch can be realized.

Currently, a driving method commonly used in the capacitive touch screen is a time division driving method, i.e., performing display driving and touch control signal detection driving step by step: only performing scanning operation for display driving signals in a first time period (in this time period, not performing detection of touch control signals) in one period of time (for example, one frame time), and then performing detection operation of touch control signals in other time period (in this time period, not performing scanning for display driving signals) of the period of time The existing time division driving method gives less detection time for touch control signals, causing a high detection frequency of the touch control signals, and this increases internal noise of the touch control display device and affects the display quality of the touch control display device.

SUMMARY

The present disclosure provides a touch control display device and its driving method, which can synchronously execute display driving and touch control detection, to extend time of touch control detection and reduce transmission frequency of touch control detection signals, thereby reducing noise of the touch control display device and improving displaying quality of the touch control display device.

Solutions provided in the present disclosure are as follows.

The present disclosure provides a touch control display device including a first substrate; wherein the first substrate includes a plurality of common electrodes and a touch control driving electrode block matrix arranged in a same layer; a projection area of one matrix row of the touch control driving electrode block matrix on the first substrate corresponds to at least one gate line; each column of the touch control driving electrode block matrix includes a first touch control driving electrode block and a second touch control driving electrode block; the second touch control driving electrode blocks in different matrix columns belong to different matrix rows;

the first substrate further includes:

a plurality of first touch control driving signal transmission lines corresponding to each column of the touch control driving electrode block matrix; the first touch control driving signal transmission lines being electrically connected with first touch control driving electrode blocks in corresponding matrix columns, and configured to transmit in turns a first touch control driving signal to the first touch control driving electrode blocks in the corresponding matrix columns in a display time period; wherein gate lines corresponding to the first touch control driving electrode blocks which receive the first touch control driving signal are in an off state; when a gate line corresponding to the first touch control driving electrode block in one matrix column is in the off state, a gate line corresponding to the second touch control driving electrode block in the matrix column is in an on state;

a second touch control driving signal transmission line connected with the second touch control driving electrode blocks in all the matrix columns of the touch control driving electrode block matrix, and configured to transmit a second touch control driving signal to the second touch control driving electrode blocks in all the matrix columns between adjacent display time periods.

Optionally, the touch control display device includes a touch control display region; a length of the touch control display region in a column direction of the touch control driving electrode block matrix, is greater than a length of the touch control display region in a row direction of the touch control driving electrode block matrix.

Optionally, the pluralities of common electrodes and the touch control driving electrode block matrix are arranged within the touch control display region.

Optionally, the pluralities of common electrodes in the first substrate and the matrix rows of the touch control driving electrode block matrix are alternately arranged and extend along a same direction.

Optionally, the touch control display device further includes a second substrate; the second substrate includes a plurality of detection electrodes; positions of the detection electrodes correspond to positions of the common electrodes in the first substrate.

Optionally, the first substrate is an array substrate and the second substrate is a color filter substrate.

Optionally, touch control driving signal transmission lines are leaded out of the touch control display region from at least one side of the touch control display region.

Optionally, the side of the touch control display region from which the touch control driving signal transmission lines are leaded out, is opposite to a side of the touch control display region from which the gate lines are leaded in.

Optionally, a matrix row where the first touch control driving electrode block that receives the first touch control driving signal is located, is spaced by a predetermined distance of a matrix row from one matrix row where the second touch control driving electrode block corresponding to the gate line that is currently in the on state is located.

Optionally, the touch control driving electrode block matrix includes N matrix rows and M matrix columns, where N and M are positive integers greater than or equal to 2;

in an M-th matrix column, a touch control driving electrode block in an N-th matrix row is the second touch control driving electrode block, and touch control driving electrode blocks in other matrix rows are first touch control driving electrode blocks;

the first substrate includes M first touch control driving signal transmission lines and one second touch control driving signal transmission line;

the M first touch control driving signal transmission lines are connected with the first touch control driving electrode blocks in the M matrix columns, respectively; the second touch control driving signal transmission line is connected with the second touch control driving electrode blocks in all the M matrix columns.

Optionally, the display time period is one frame time.

Optionally, the touch control driving electrode block matrix comprises N matrix rows and N matrix columns, where N is positive integer greater than or equal to 2; in an i-th matrix column, a touch control driving electrode block in an i-th matrix row is the second touch control driving electrode block, and touch control driving electrode blocks in other matrix rows are first touch control driving electrode blocks, wherein i is positive integer greater than or equal to 1 and smaller than or equal to N.

Optionally, the touch control driving electrode block matrix comprises N matrix rows and N matrix columns, where N is positive integer greater than or equal to 2; in an i-th matrix column, a touch control driving electrode block in an j-th matrix row is the second touch control driving electrode block, and touch control driving electrode blocks in other matrix rows are first touch control driving electrode blocks, wherein i and j are positive integers greater than or equal to 1 and smaller than or equal to N, and i+j−1=N.

One embodiment of the present disclosure further provides a method for driving the above touch control display device, the method includes:

in a display time period, inputting a first touch control driving signal to a first touch control driving signal transmission line which is connected with a first touch control driving electrode block in a first matrix column; wherein a gate line corresponding to the first touch control driving electrode block which receives the first touch control driving signal is in an off state; when the gate line corresponding to the first touch control driving electrode block in the first matrix column is in the off state, a gate line corresponding to a second touch control driving electrode block in the first matrix column is in an on state;

in the display time period, inputting, in a predetermined order, the first touch control driving signal to first touch control driving signal transmission lines which are connected with first touch control driving electrode blocks in other matrix columns; and between the display time period and a next display time period, inputting a second touch control driving signal to a second touch control driving signal transmission line.

It can be seen from the above descriptions that, the touch control display device and its driving method provided in one embodiment of the present disclosure, the first touch control driving signal is transmitted in turns to the first touch control driving electrode blocks in corresponding matrix columns in one display time period; the gate lines corresponding to the first touch control driving electrode blocks which receive the first touch control driving signal are in the off state; when the gate line corresponding to the first touch control driving electrode block in one matrix column is in the off state, the gate line corresponding to the second touch control driving electrode block in the matrix column is in an on state. The second touch control driving signal is further input to the second touch control driving electrode blocks between adjacent display time periods. Thus, the synchronous execution of the display driving and touch control detection may extend time of touch control detection and reduce transmission frequency of touch control detection signals, thereby reducing noise of the touch control display device and improving displaying quality of the touch control display device.

DETAILED DESCRIPTION

To make the objects, the technical solutions and the advantages of embodiments of the present disclosure more apparent, the technical solutions of the embodiments of the present disclosure will be described in detail hereinafter in conjunction with the drawings of the embodiments of the present disclosure. Apparently, the embodiments described hereinafter are only some embodiments of the present disclosure, but not all embodiments. Based the embodiments described hereinafter, other embodiments obtained by those skilled in the art should fall within the scope of the present disclosure.

Unless otherwise defined, the technical or scientific terms used in the present disclosure shall have the general meanings understandable for those ordinarily skilled in the field of the present disclosure. The wordings such as "first", "second" or similar used in the description and claims of the present disclosure shall not represent any order, number or importance, but are used for distinguishing different elements. Similarly, the words such as "an", "a" or similar shall not represent limitation of numbers, but mean existence of at least one. The phrases "couple", "connect" or similar are not limited to physical or mechanical connection, but also include electrical connection, no matter directly or indirectly. The phrases "upper", "lower", "left", "right" and etc. shall be used only to represent relative positions, wherein, when the absolute position of the described object is changed, the relative positions may be changed accordingly.

Figure 1:
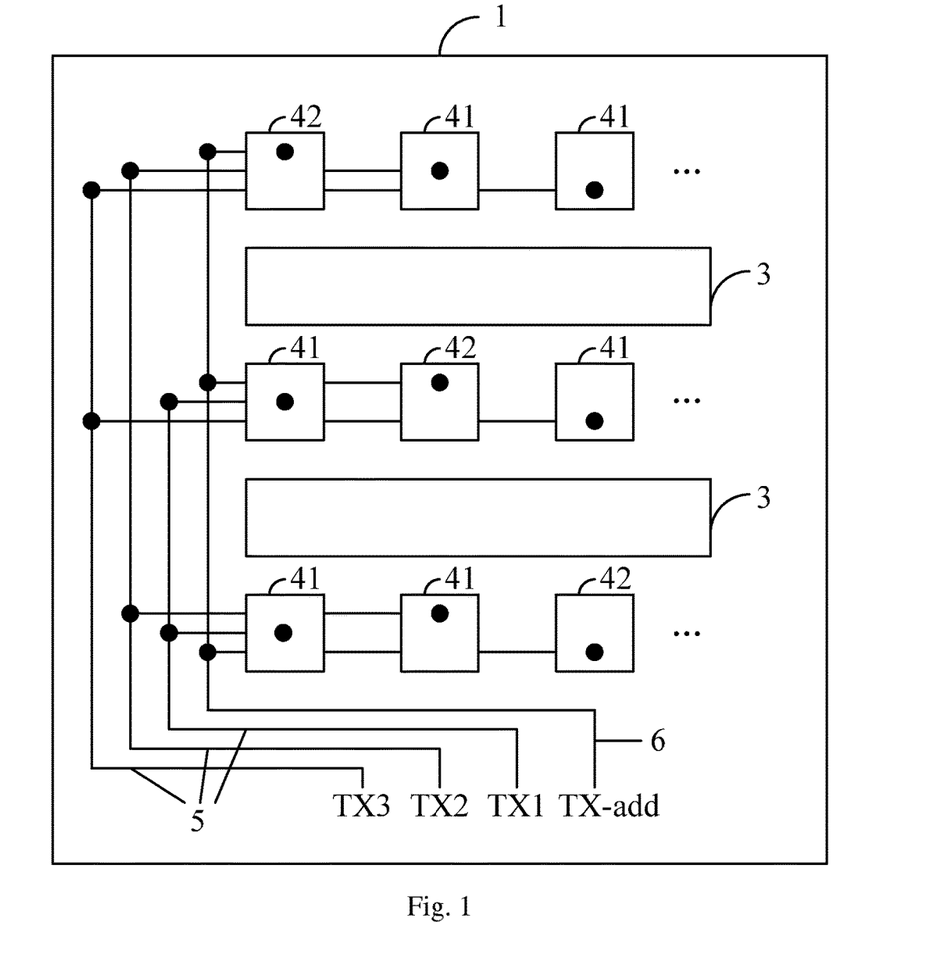
FIG. 1 is a schematic diagram showing a structure of a first substrate of a touch control display device according to one embodiment of the present disclosure.

One embodiment of the present disclosure provides a touch control display device, including a first substrate 1. As shown in FIG. 1, the first substrate 1 includes a plurality of common electrodes 3 and a touch control driving electrode block matrix arranged in a same layer. A projection area of one matrix row of the touch control driving electrode block matrix on the first substrate corresponds to at least one gate line. Each column of the touch control driving electrode block matrix includes a first touch control driving electrode block 41 and a second touch control driving electrode block 42. The second touch control driving electrode blocks 42 in different matrix columns belong to different matrix rows.

Figure 6:
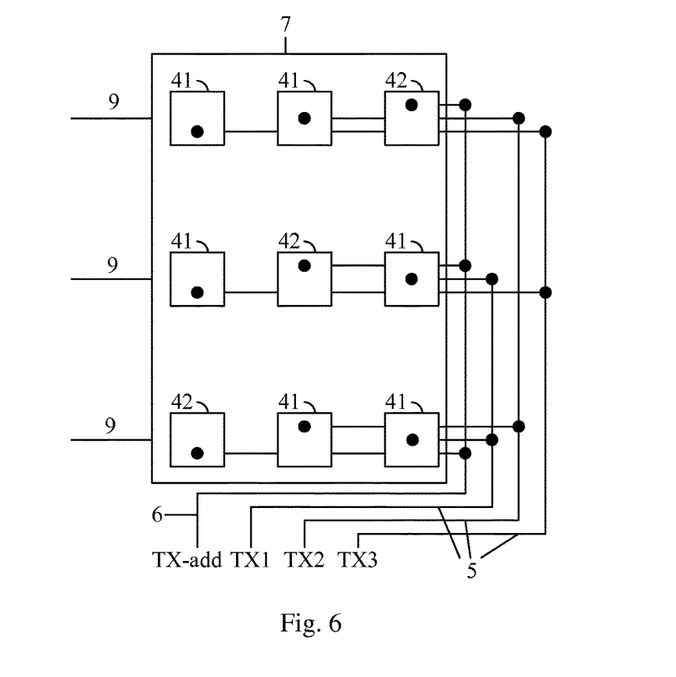
FIG. 6 is a third schematic diagram showing lead wires for a touch control display region of the touch control display device according to one embodiment of the present disclosure.

As shown in FIG. 1 and FIG. 6, the first substrate specifically may further include:

a plurality of first touch control driving signal transmission lines 5 (TXn) corresponding to each column of the touch control driving electrode block matrix; the first touch control driving signal transmission lines 5 electrically connected with first touch control driving electrode blocks 41 in a corresponding matrix column, and configured to transmit in turns a first touch control driving signal to the first touch control driving electrode blocks 41 in the corresponding matrix column within a display time period; gate lines 9 corresponding to the first touch control driving electrode blocks 41 which receive the first touch control driving signal being in an off state; when the gate lines 9 corresponding to the first touch control driving electrode blocks 41 in one matrix column are in the off state, the gate line 9 corresponding to the second touch control driving electrode block 42 in the matrix column is in an on state;

a second touch control driving signal transmission line 6 (TX-add) connected with the second touch control driving electrode blocks 42 in all matrix columns of the touch control driving electrode block matrix, and configured to transmit a second touch control driving signal to the second touch control driving electrode blocks 42 in all matrix columns between adjacent display time periods.

Through the above structures, when the gate line 9 corresponding to one matrix row of the touch control driving electrode block matrix (generally, the projection area of one matrix row on the first substrate may include a plurality of pixel rows, thus, in one embodiment of the present disclosure, one matrix row may correspond to at least one gate line 9) is in the on state, the touch control display device provided in one embodiment of the present disclosure does not transmit the first touch control driving signal to the first touch control driving signal transmission lines 5 which are connected with the touch control driving electrode blocks in the matrix row, but transmits a corresponding first touch control driving signal to other first touch control driving signal transmission lines 5 which are not connected with the touch control driving electrode blocks in the matrix row, thus, display driving and touch control detection may be synchronously realized in a display time period (for example, in one frame time). Then, comparing with the existing time division driving control mode, the touch control display device provided in one embodiment of the present disclosure may extend time of touch control detection and reduce transmission frequency of touch control detection signals, thereby reducing internal noise of the touch control display device and improving displaying quality of the touch control display device.

Meanwhile, in order to avoid omission occurring in the touch control detection, between adjacent two display time periods, the touch control display device provided in one embodiment of the present disclosure may transmit a second touch control driving signal to the second touch control driving signal transmission line 6 which is connected with the second touch control driving electrode blocks 42 (i.e., touch control driving electrode blocks on which the touch control detection is not performed synchronously with displaying driving) in all the matrix columns, to realize detection of touch control operation happened in a touch control region corresponding to the second touch control driving electrode blocks 42. Since the second touch control driving signal transmission line 6 is connected with the second touch control driving electrode blocks 42 in all the matrix columns, thus, the touch control detection for all the second touch control driving electrode blocks 42 may be realized by merely using at least one second touch control driving signal transmission line 6 to transmit the second touch control detection signal for one time. Therefore, the touch control detection for the second touch control driving electrode blocks 42 does not take very long time and does not affect normal displaying of the touch control display device.

Further, in the touch control display device provided in one embodiment of the present disclosure, since the above structure may avoid simultaneous transmission of driving signals in the gate lines 9 and touch control signal transmission lines (including the first touch control driving signal transmission lines 5 and the second touch control driving signal transmission line 6) which are intersected with the gate lines 9, thus, signal interference between the gate lines 9 and touch control signal transmission lines may be avoided, and this further improve the display quality of the touch control display device.

Figure 2:
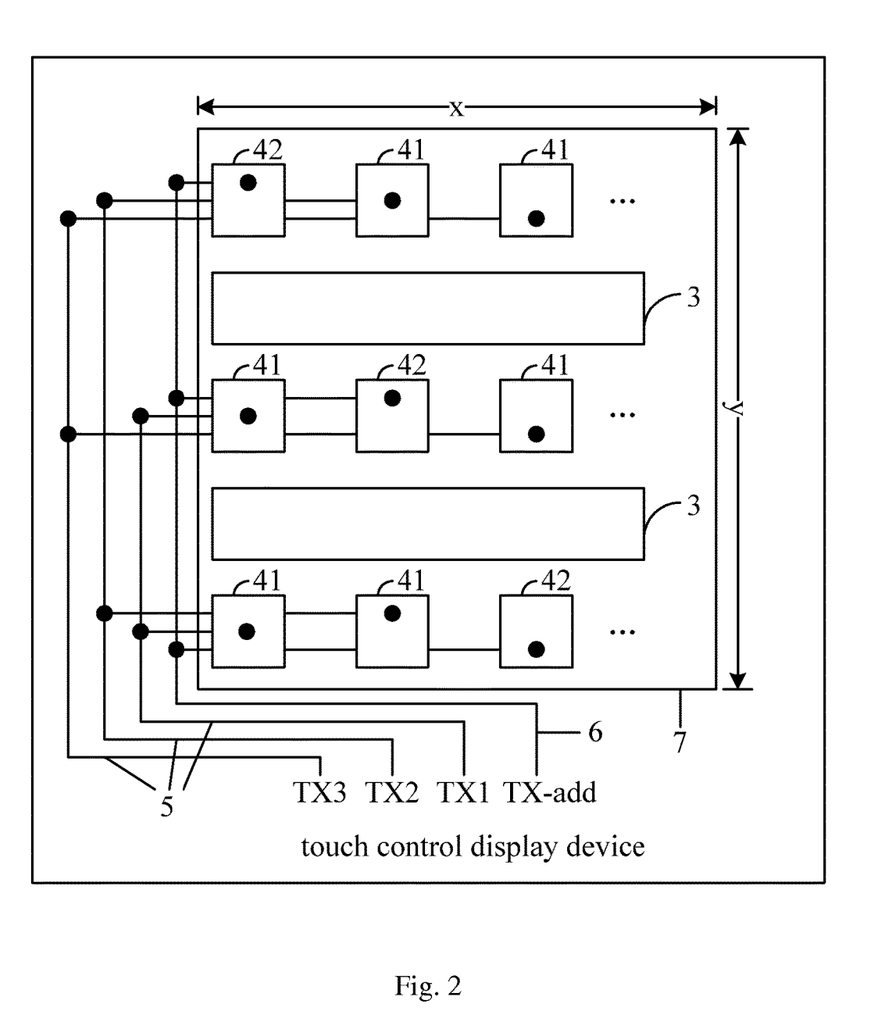
FIG. 2 is a schematic diagram showing a structure of a touch control display device according to one embodiment of the present disclosure.

As shown in FIG. 2, the touch control display device provided in one embodiment of the present disclosure may specifically include a touch control display region 7.

In order to correspond to a structure of an existing touch control display such as a mobile phone, in one embodiment of the present disclosure, the touch control display region 7 specifically may be a vertical screen structure, that is, as shown in FIG. 2, a length value y of the touch control display region 7 in a column direction of the touch control driving electrode block matrix, is greater than a length value x of the touch control display region 7 in a row direction of the touch control driving electrode block matrix. Of course, the touch control display region 7 involved in one embodiment of the present disclosure may also be a horizontal screen structure, or have any geometric shape and corresponding structures.

Then, it can be seen from structures shown in FIG. 2, positions of the pluralities of common electrodes 3 and the touch control driving electrode block matrix involved in one embodiment of the present disclosure are set within the touch control display region 7.

Meanwhile, as shown in FIG. 2, the pluralities of common electrodes 3 in the first substrate 1 involved in one embodiment of the present disclosure and the matrix rows of the touch control driving electrode block matrix may be alternately arranged and extend along a same direction.

Figure 3:
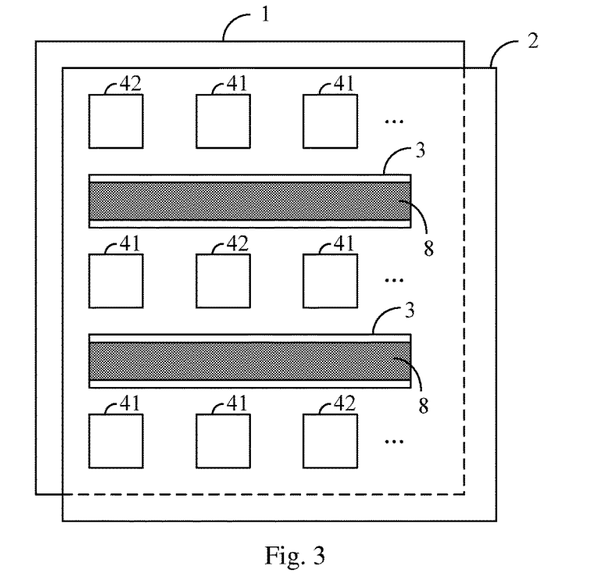
FIG. 3 is a schematic diagram showing positions of the first substrate and a second substrate of the touch control display device according to one embodiment of the present disclosure.

As shown in FIG. 3, the touch control display device provided in one embodiment of the present disclosure may further include a second substrate 2. The second substrate 2 is disposed corresponding to the first substrate 1, for example, an array substrate and a color filter substrate of a touch control liquid crystal display device are disposed opposite to each other.

The second substrate 2 involved in one embodiment of the present disclosure specifically may include a plurality of detection electrodes 8 (TX). Positions of the detection electrodes 8 in the second substrate specifically may be the same as the positions of the common electrodes 3 in the first substrate, specifically as shown in FIG. 3, i.e., the two are spatially overlapped each other.

Figure 4:
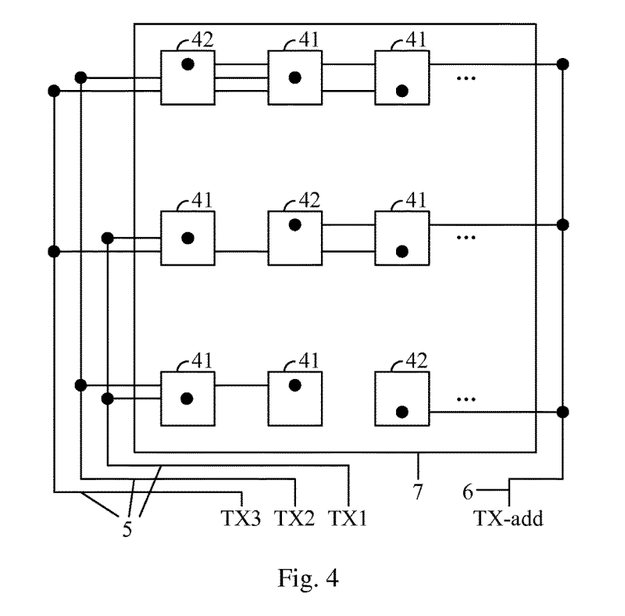
FIG. 4 is a first schematic diagram showing lead wires for a touch control display region of the touch control display device according to one embodiment of the present disclosure.
Figure 5:
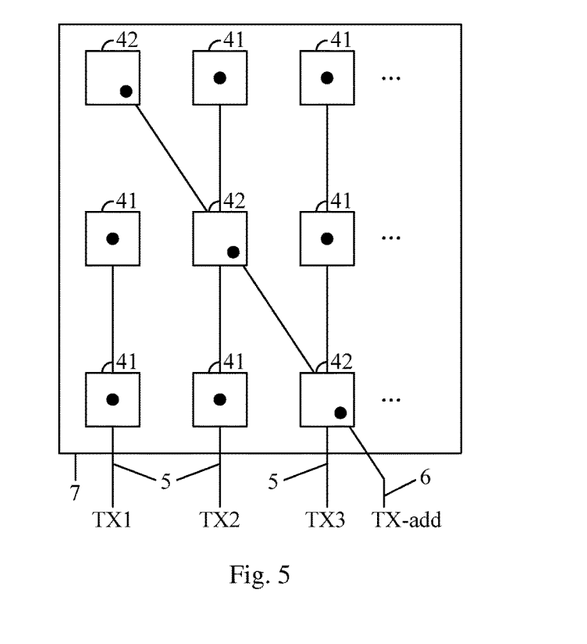
FIG. 5 is a second schematic diagram showing lead wires for a touch control display region of the touch control display device according to one embodiment of the present disclosure.

In the embodiment shown in FIG. 1, the touch control driving signal transmission lines (including the first touch control driving signal transmission lines 5 and the second touch control driving signal transmission line 6) are leaded out of the touch control display region 7 from a left side of the touch control display region 7. However, actually, the touch control driving signal transmission lines may be leaded out of the touch control display region 7 from at least one side of the touch control display region 7, for example, two sides including left and right sides shown in FIG. 4 as well as a bottom side shown in FIG. 5 (for intersected touch control driving signal transmission lines, a shielding insulation layer may be provided at two intersected touch control driving signal transmission lines).

In one specific embodiment, in case of avoiding occurrence of intersection of the touch control driving signal transmission lines and the gate lines 9, in one embodiment of the present disclosure, one side of the touch control display region 7 from which a plurality of touch control driving signal transmission lines is leaded out, is opposite to a side of the touch control display region 7 from which the gate lines 9 are leaded in. As shown in FIG. 6, when the gate lines 9 are leaded in the touch control display region 7 from the left side of the touch control display region 7, the touch control driving signal transmission lines may be leaded out of the touch control display region 7 from the right side of the touch control display region 7 in one embodiment of the present disclosure, thereby solving the mutual interference between the gate lines 9 and the touch control signal transmission lines.

One specific embodiment of the touch control display device provided in the present disclosure will de described in detail hereinafter.

Figure 7:
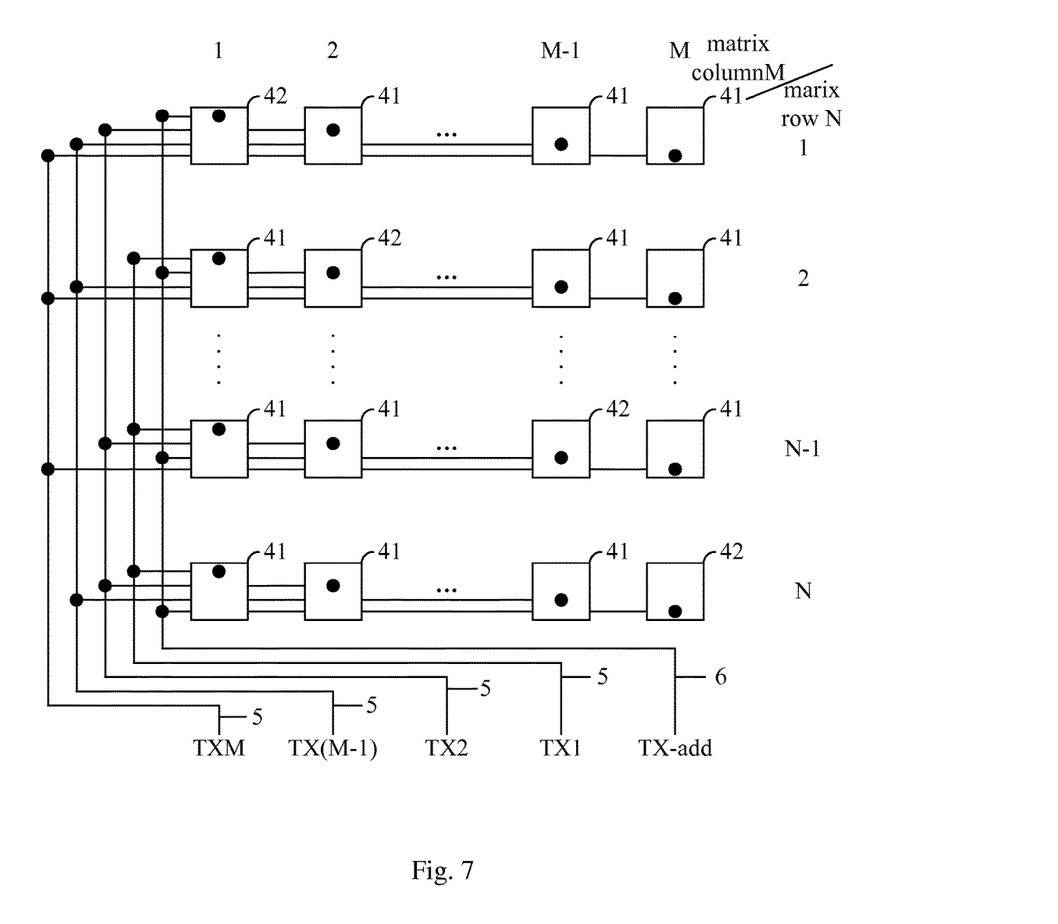
FIG. 7 is a forth schematic diagram showing lead wires for a touch control display region of the touch control display device according to one embodiment of the present disclosure.

In this embodiment, as shown in FIG. 7, the touch control driving electrode block matrix specifically may include N matrix rows and M matrix columns, where N and M are positive integers greater than or equal to 2.

In an M-th matrix column, one touch control driving electrode block in an N-th matrix row is one second touch control driving electrode block 42, and touch control driving electrode blocks in other matrix rows are first touch control driving electrode blocks 41.

For example, as shown in FIG. 7, in a first matrix column, one touch control driving electrode block in a first matrix row is one second touch control driving electrode block 42, while touch control driving electrode blocks in the first matrix column are first touch control driving electrode blocks 41 except for the touch control driving electrode block in the first matrix row. In a second matrix column, one touch control driving electrode block in a second matrix row is one second touch control driving electrode block 42, while touch control driving electrode blocks in the second matrix column are first touch control driving electrode blocks 41 except for the touch control driving electrode block in the second matrix row; and so on, until the last matrix column, one touch control driving electrode block in an N-th matrix row is one second driving electrode block 42, while touch control driving electrode blocks are first touch control driving electrode blocks 41 except for the touch control driving electrode block in the N-th matrix row.

In this embodiment, the first substrate 1 specifically may include M first touch control driving signal transmission lines 5 and one second touch control driving signal transmission line 6. The M first touch control driving signal transmission lines are connected with the first touch control driving electrode blocks 41 in the M matrix columns, respectively; the second touch control driving signal transmission line is connected with the second touch control driving electrode blocks 42 in all the M matrix columns.

For example, as shown in FIG. 7, a first one of the first touch control driving signal transmission lines 5, i.e., TX1, is connected with the first touch control driving electrode blocks 41 in the first matrix column; a second one of the first touch control driving signal transmission lines 5, i.e., TX2, is connected with the first touch control driving electrode blocks 41 in the second matrix column; and so on, until the M-th one of the first touch control driving signal transmission lines 5 is connected with the first touch control driving electrode blocks 41 in the M-th matrix column. The second touch control driving signal transmission line 6 (TX-add) is connected with the second touch control driving electrode blocks 42 in all the M matrix columns.

Figure 8:
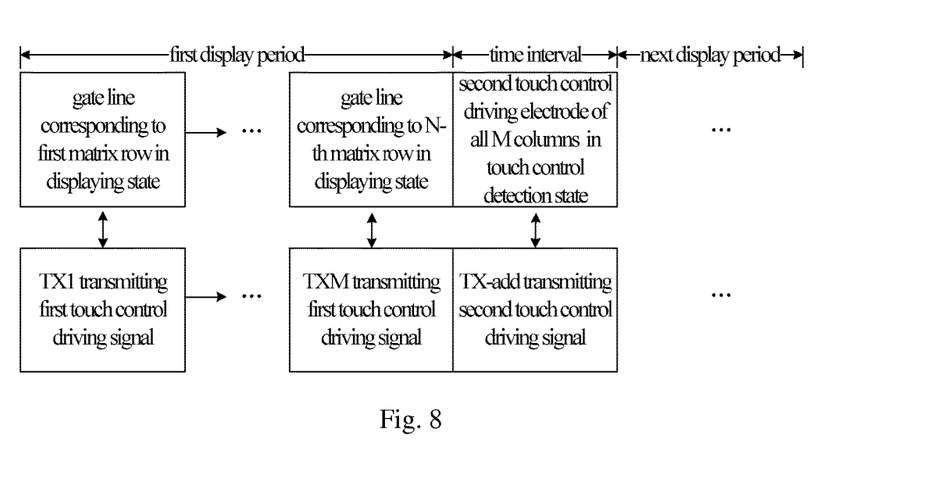
FIG. 8 is a schematic diagram showing a timing sequence of the touch control display device according to one embodiment of the present disclosure.

Then, as shown in FIG. 8, in one display time period (for example, one frame time), when a gate line 9 corresponding to the first matrix row is in the on state (that is, the gate line 9 transmits a gate driving signal, one pixel row at a position where the first matrix row is located is in a display driving state), the first touch control driving signal is input to the TX1 which is not connected with the second touch control driving electrode block 42 of the first matrix column in the first matrix row, and the TX1 transmits the first touch control driving signal to the first touch control driving electrode blocks 41 of the first matrix column, to realize detection of touch control detection in a touch control region corresponding to positions where the first touch control driving electrode blocks 41 of the first matrix column are located.

Since the gate lines are usually scanned row by row, thus, after scanning a gate line corresponding to the first matrix row, a gate line corresponding to the second matrix row is scanned. Then, when the gate line corresponding to the second matrix row is in the on state, the first touch control driving signal is input to the TX2 which is not connected with the second touch control driving electrode block 42 of the second matrix column in the second matrix row, and the TX2 transmits the first touch control driving signal to the first touch control driving electrode blocks 41 of the second matrix column, to realize detection of touch control in a touch control region corresponding to positions where the first touch control driving electrode blocks 41 of the second matrix column are located.

And so on, until a gate line corresponding to a position where the N-th matrix row is located is in the on state, the first touch control driving signal is input to the TX(M), and the TX(M) transmits the first touch control driving signal to the first touch control driving electrode blocks 41 of the M-th matrix column, to realize detection of touch control in positions where the first touch control driving electrode blocks 41 of the M-th matrix column are located, thereby in one display time period realizing detection of touch control in the touch control regions corresponding to positions where the first touch control driving electrode blocks 41 of all the matrix columns are located.

Then, between adjacent two display time periods, the second touch control driving signal is input into the TX-add, and the TX-add transmits the second touch control driving signal to the second touch control driving electrode blocks 42 of all the M matrix columns, thereby realizing detection of touch control in the touch control regions corresponding to positions where the second touch control driving electrode blocks 42 of all the M matrix columns are located.

In subsequent display time periods and between adjacent display time periods, the above process is repeatedly performed, and then a synchronous execution of the display driving and touch control detection may be realized.

It can be seen from the above descriptions that, the touch control display device involved in one embodiment of the present disclosure adopts scanning column by column for touch control detection, which is completely different from scanning row by row which is widely adopted in the related art.

Although the above embodiment takes the second touch control driving electrode block 42 including one touch control driving electrode block and the first touch control driving electrode block 41 including a plurality of touch control driving electrode blocks as an example for illustration, in other embodiment, the second touch control driving electrode block 42 may also include a plurality of touch control driving electrode blocks of one matrix column and is connected with at least one second touch control driving signal transmission line.

In the above embodiment, one matrix row where first touch control driving electrode block 41 that receives the first touch control driving signal is located, is adjacent to one matrix row where second touch control driving electrode block 42 corresponding to one gate line 9 that is in the on state is located. In other embodiment, one matrix row where first touch control driving electrode block 41 that receives the first touch control driving signal is located, is spaced by a predetermined distance of one matrix row from one matrix row where second touch control driving electrode block 42 corresponding to one gate line 9 that is currently in the on state is located.

For example, in the same structure shown in FIG. 7, in the first matrix column, a touch control driving electrode block in the first matrix row is a second touch control driving electrode block 42, and a touch control driving electrode block in the second matrix row may be a second touch control driving electrode block 42 or a separate touch control driving electrode block (which does not belong to the second touch control driving electrode block 42, and does not belong to the first touch control driving electrode block 41), the separate touch control driving electrode block may be connected with the second touch control driving signal transmission line 6 (or connected with other signal lines, or may be floated in extreme case), and a touch control driving electrode block in the third matrix row is a first touch control driving electrode block 41.

When the gate line 9 corresponding to the touch control driving electrode block in the first matrix row is in the on state, the gate line 9 corresponding to the touch control driving electrode block in the second matrix row may be in the off state, but the touch control driving electrode block in the second matrix row does not receive the first touch control driving signal; while at this time, the touch control driving electrode block in the third matrix row receives the first touch control driving signal. Then, it can be seen, the matrix row where the first touch control driving electrode block 41 that receives the first touch control driving signal is located, is spaced by a distance of one matrix row from the matrix row where the second touch control driving electrode block 42 corresponding to the gate line 9 that is currently in the on state is located, thereby avoiding occurrence of interference and interaction between the display driving and the touch control detection.

The first touch control driving signal and the second touch control driving signal involved in the above embodiment of the present disclosure may be an identical touch control driving signal; and the first substrate involved in the above embodiment of the present disclosure specifically may be an array substrate, and the second substrate involved in the above embodiment of the present disclosure specifically may be a color filter substrate.

One embodiment of the present disclosure further provides a touch control display device driving method for driving the above touch control display device provided in an embodiment of the present disclosure.

Figure 9:
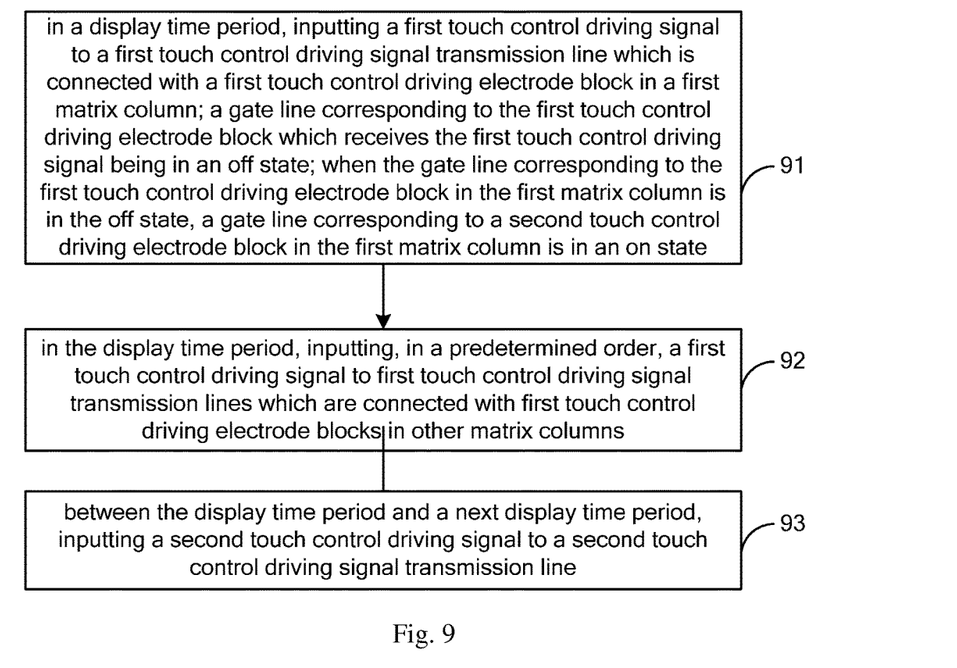
FIG. 9 is flow chart of a touch control display device driving method according to one embodiment of the present disclosure.

As shown in FIG. 9, the method specifically may include:

Step 91, in a display time period, inputting a first touch control driving signal to a first touch control driving signal transmission line 5 which is connected with a first touch control driving electrode block 41 in a first matrix column; a gate line 9 corresponding to the first touch control driving electrode block 41 which receives the first touch control driving signal being in an off state; when the gate line 9 corresponding to the first touch control driving electrode block 41 in the first matrix column is in the off state, a gate line 9 corresponding to a second touch control driving electrode block 42 in the first matrix column is in an on state;

Step 92, in the display time period, inputting, in a predetermined order, a first touch control driving signal to first touch control driving signal transmission lines 5 which are connected with first touch control driving electrode blocks 41 in other matrix columns;

Step 93, between the display time period and a next display time period, inputting a second touch control driving signal to a second touch control driving signal transmission line 6.

It can be seen from the above descriptions that, the touch control display device and its driving method are provided in embodiments of the present disclosure, the first touch control driving signal is transmitted in turns to the first touch control driving electrode blocks in corresponding matrix columns in one display time period; the gate lines corresponding to the first touch control driving electrode blocks which receive the first touch control driving signal are in the off state; when the gate line corresponding to the first touch control driving electrode block in one matrix column is in the off state, the gate line corresponding to the second touch control driving electrode block in the matrix column is in an on state. The second touch control driving signal is further input to the second touch control driving electrode blocks between adjacent display time periods. Thus, the synchronous execution of the display driving and touch control detection may extend time of touch control detection and reduce transmission frequency of touch control detection signals, thereby reducing noise of the touch control display device and improving displaying quality of the touch control display device.

The above are merely embodiments of the present disclosure. It should be appreciated that, a person skilled in the art may make further improvements and modifications without departing from the principle of the present disclosure, and these improvements and modifications shall also fall within the scope of the present disclosure.

What is claimed is:

1. A touch control display device comprising a first substrate; wherein the first substrate comprises a plurality of common electrodes and a touch control driving electrode block matrix arranged in a same layer; a projection area of one matrix row of the touch control driving electrode block matrix on the first substrate corresponds to at least one gate line; each column of the touch control driving electrode block matrix comprises a first touch control driving electrode block and a second touch control driving electrode block; the second touch control driving electrode blocks in different matrix columns belong to different matrix rows;

the first substrate further comprises:
a plurality of first touch control driving signal transmission lines corresponding to each column of the touch control driving electrode block matrix; the first touch control driving signal transmission lines being electrically connected with first touch control driving electrode blocks in corresponding matrix columns, and configured to transmit in turns a first touch control driving signal to the first touch control driving electrode blocks in the corresponding matrix columns in a display time period; wherein gate lines corresponding to the first touch control driving electrode blocks which receive the first touch control driving signal are in an off state; when a gate line corresponding to the first touch control driving electrode block in one matrix column is in the off state, a gate line corresponding to the second touch control driving electrode block in the matrix column is in an on state;

a second touch control driving signal transmission line connected with the second touch control driving electrode blocks in all the matrix columns of the touch control driving electrode block matrix, and configured to transmit a second touch control driving signal to the second touch control driving electrode blocks in all the matrix columns between adjacent display time periods.

2. The touch control display device according to claim 1, wherein the touch control display device comprises a touch control display region;
a length of the touch control display region in a column direction of the touch control driving electrode block matrix, is greater than a length of the touch control display region in a row direction of the touch control driving electrode block matrix.

3. The touch control display device according to claim 2, wherein the pluralities of common electrodes and the touch control driving electrode block matrix are arranged within the touch control display region.

4. The touch control display device according to claim 3, wherein the pluralities of common electrodes and the matrix rows of the touch control driving electrode block matrix are alternately arranged and extend along a same direction.

5. The touch control display device according to claim 1, wherein the touch control display device further comprises a second substrate; the second substrate comprises a plurality of detection electrodes; positions of the detection electrodes correspond to positions of the common electrodes.

6. The touch control display device according to claim 5, wherein the first substrate is an array substrate and the second substrate is a color filter substrate.

7. The touch control display device according to claim 2, wherein the touch control driving signal transmission lines are leaded out of the touch control display region from at least one side of the touch control display region.

8. The touch control display device according to claim 7, wherein the side of the touch control display region from which the touch control driving signal transmission lines are leaded out, is opposite to a side of the touch control display region from which the gate lines are leaded in.

9. The touch control display device according to claim 1, wherein a matrix row where the first touch control driving electrode block that receives the first touch control driving signal is located, is spaced by a predetermined distance of one matrix row from a matrix row where the second touch control driving electrode block corresponding to the gate line that is currently in the on state is located.

10. The touch control display device according to claim 1, wherein the touch control driving electrode block matrix comprises N matrix rows and M matrix columns, where N and M are positive integers greater than or equal to 2;
in an M-th matrix column, a touch control driving electrode block in an N-th matrix row is the second touch control driving electrode block, and touch control driving electrode blocks in other matrix rows are first touch control driving electrode blocks;
the first substrate comprises M first touch control driving signal transmission lines and one second touch control driving signal transmission line;
the M first touch control driving signal transmission lines are connected with the first touch control driving electrode blocks in the M matrix columns, respectively; the second touch control driving signal transmission line is connected with the second touch control driving electrode blocks in all the M matrix columns.

11. The touch control display device according to claim 1, wherein the display time period is one frame time.

12. A method for driving the touch control display device according to claim 1, comprising:
in a display time period, inputting a first touch control driving signal to a first touch control driving signal transmission line which is connected with a first touch control driving electrode block in a first matrix column; wherein a gate line corresponding to the first touch control driving electrode block which receives the first touch control driving signal is in an off state; when the gate line corresponding to the first touch control driving electrode block in the first matrix column is in the off state, a gate line corresponding to a second touch control driving electrode block in the first matrix column is in an on state;
in the display time period, inputting, in a predetermined order, the first touch control driving signal to first touch control driving signal transmission lines which are connected with first touch control driving electrode blocks in other matrix columns; and
between the display time period and a next display time period, inputting a second touch control driving signal to a second touch control driving signal transmission line.

13. The touch control display device according to claim 4, wherein the touch control display device further comprises a second substrate; the second substrate comprises a plurality of detection electrodes; positions of the detection electrodes correspond to positions of the common electrodes.

14. The touch control display device according to claim 13, wherein the first substrate is an array substrate and the second substrate is a color filter substrate.

15. The touch control display device according to claim 1, wherein the touch control driving electrode block matrix comprises N matrix rows and N matrix columns, where N is positive integer greater than or equal to 2;

in an i-th matrix column, a touch control driving electrode block in an i-th matrix row is the second touch control driving electrode block, and touch control driving electrode blocks in other matrix rows are first touch control driving electrode blocks, wherein i is positive integer greater than or equal to 1 and smaller than or equal to N.

16. The touch control display device according to claim 1, wherein the touch control driving electrode block matrix comprises N matrix rows and N matrix columns, where N is positive integer greater than or equal to 2;

in an i-th matrix column, a touch control driving electrode block in an j-th matrix row is the second touch control driving electrode block, and touch control driving electrode blocks in other matrix rows are first touch control driving electrode blocks, wherein i and j are positive integers greater than or equal to 1 and smaller than or equal to N, and $i+j-1=N$.

* * * * *